United States Patent [19]
Richard et al.

[11] 3,789,612
[45] Feb. 5, 1974

[54] METHOD OF SURF GENERATION

[76] Inventors: George E. Richard, 207 42nd St., Manhattan Beach, Calif. 90266; Eugene D. Richard, 11570 Victory Blvd., North Hollywood, Calif. 91606

[22] Filed: Mar. 27, 1972

[21] Appl. No.: 238,080

Related U.S. Application Data
[62] Division of Ser. No. 56,314, July 20, 1970.

[52] U.S. Cl............................ 61/1, 4/172.16, 272/26
[51] Int. Cl.................................................. E02b 3/00
[58] Field of Search...... 61/1; 4/172.16; 272/26, 17, 272/3

[56] References Cited
UNITED STATES PATENTS

| | | | |
|---|---|---|---|
| 2,222,010 | 11/1940 | Witte et al. | 4/172.16 X |
| 3,477,233 | 11/1969 | Andersen | 61/1 |
| 2,019,829 | 11/1935 | Price | 272/26 |
| 3,473,334 | 10/1969 | Dexter | 61/1 |

FOREIGN PATENTS OR APPLICATIONS

| 375,684 | 6/1932 | Great Britain | 272/26 |
|---|---|---|---|

*Primary Examiner*—Jacob Shapiro
*Attorney, Agent, or Firm*—Frederick E. Mueller

[57] ABSTRACT

A tapered enclosure for a body of water has a wave generator positioned in a relatively narrow and deeper end. In one form, the wave generator is a buoyant plunger mounted for vertical reciprocation within a chamber having a shorewardly facing opening. Through a cyclic control system, the plunger is driven in phase with the forces of gravity and buoyancy acting thereon, starting from a rest position through strokes of increasing amplitude until a desired steady state is attained to sequentially produce waves of a desired energy. Provision is made for varying the mass of the plunger and varying the input from a prime mover as a means of adjusting wave energy and frequency.

An alternative single-wave generator comprises an open bottom water-tight enclosure having air purge valves on its upper face and connected to a prime mover for raising the tank. Upon lowering, the purge valves open, allowing air to escape from the tank while the open lower end of the tank enters the water for filling to a predetermined level. Upon the tank being pulled upwardly, with the purge valves closed, a volume of water contained within the tank is upwardly displaced, above still water level, and released when the hydrostatic equilibrium between the contained water and the outer water is upset, as when the open lower end of the tank breaks the surface of the water.

The tapered planform and sloping floor of the enclosure provide a wave energy conserving contour, so oriented with respect to the generator as to provide a primary wave break trajectory of optimum length for the area utilized by the system. A compound floor curvature may be provided to define a wave regenerating cavity to form a secondary wave out of the energy of a previously broken primary wave. A water inlet is disposed adjacent the wave generator and an outlet or outlets are disposed adjacent a point or points of wave dissipation, along the shallow end of the enclosure, to provide a circulatory system adapted for convenient monitoring and maintaining of optimum water quality.

7 Claims, 9 Drawing Figures

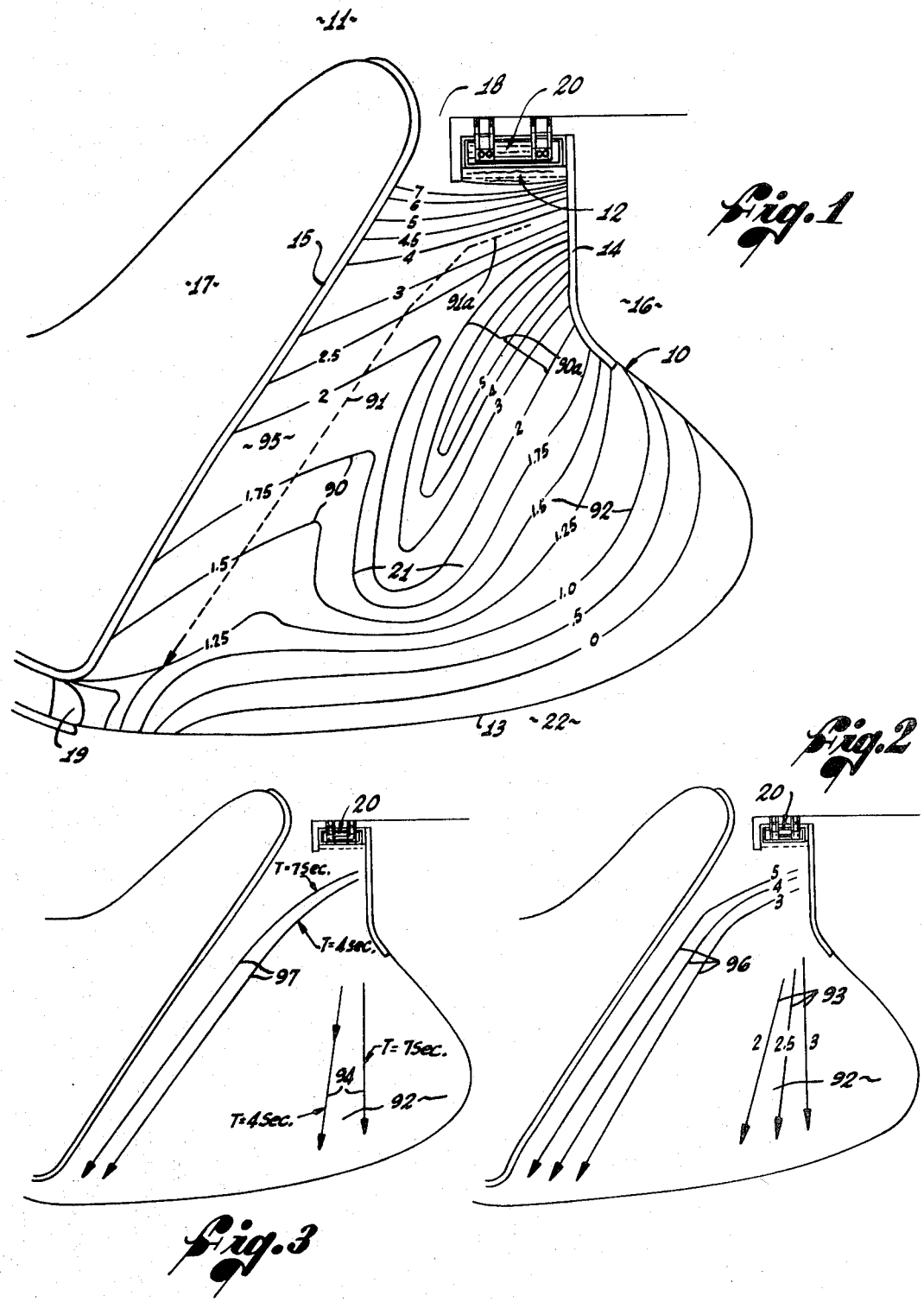

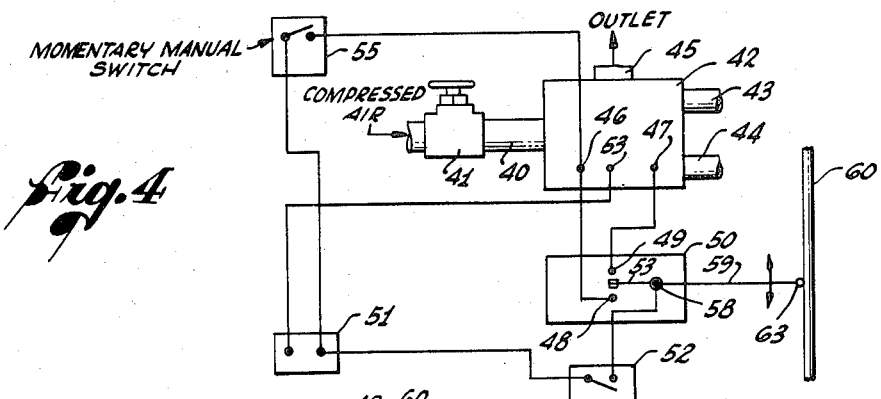
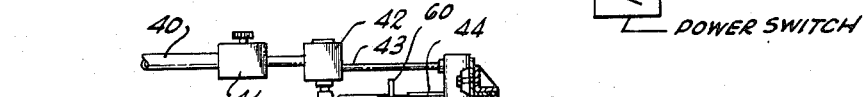
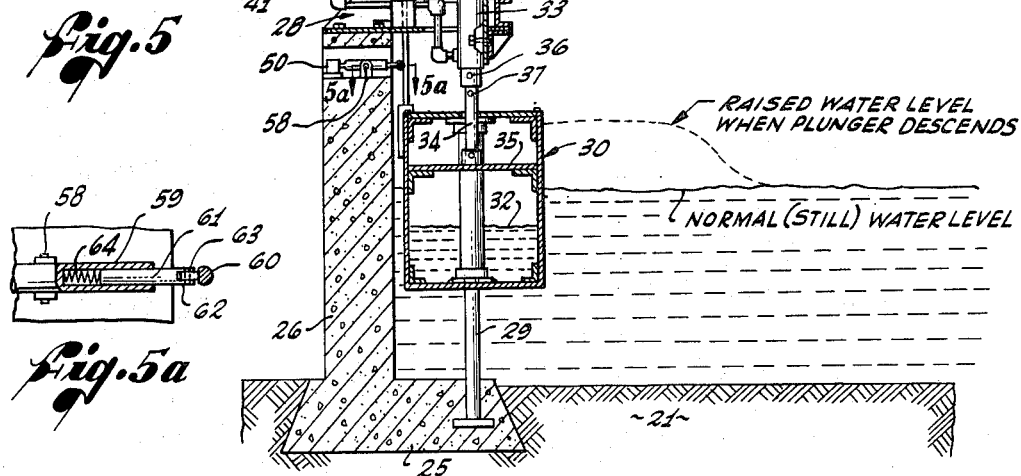
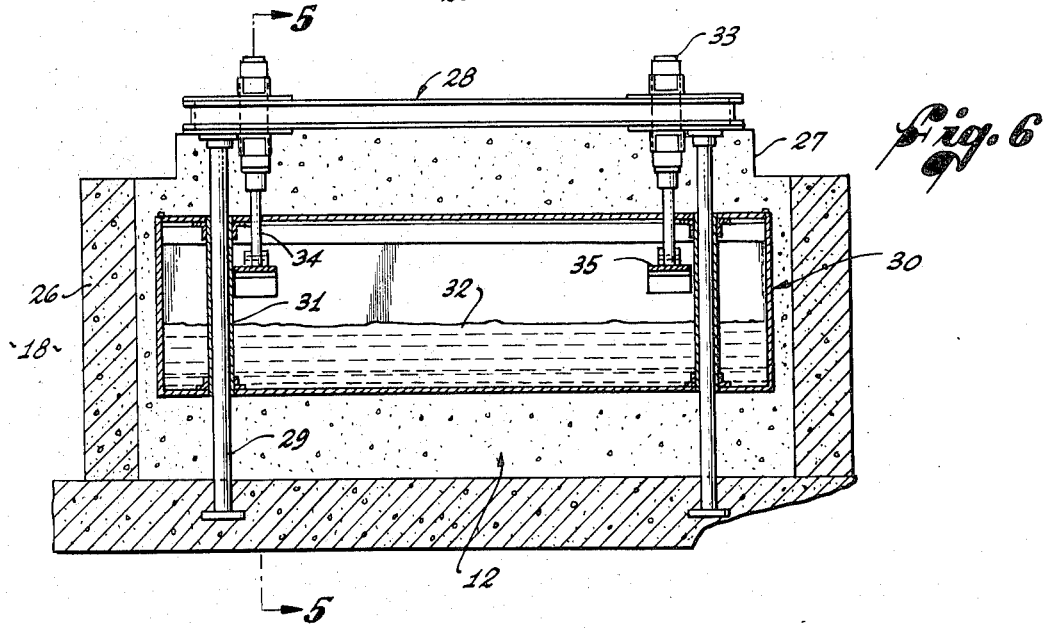

METHOD OF SURF GENERATION

This is a division of application Ser. No. 56,314, filed July 20, 1970.

BACKGROUND OF THE INVENTION

This invention relates to the artifical production of ocean-like surf of recreational utility.

It is known in the art to generate waves for amusement purposes, cinematic effects, demonstrations of wave interference phenomena, model studies or the like. However, so far as the prior state of the art is concerned, it has not heretofore been possible to produce waves of ocean magnitude and energy, specifically adapted for surf riding and the like, on an efficient and economical basis. Typically, wave generation has been performed with devices which require great amounts of power when attempted to be used to produce waves of any real recreational utility, i.e., of suitable size, shape and energy. These devices employ strictly scheduled and fixed processes of mechanical movement which inhibit efficient wave generation. As a result, excessive prime mover capacity and unduly massive structures have been required in order to withstand the forces involved, when applied to full scale wave generation. In addition, previously available systems are not adapted to utilize their wave energy by channeling it to produce waves of a desired energy that break along predetermined trajectories.

SUMMARY OF THE INVENTION

The system comprises a substantially enclosed body of water which, preferably, is somewhat tapered in planform. The floor of the enclosure has a topography developing from a relatively deep and narrow end to a shallow and wider shoreline, with the wave generator apparatus being disposed in the narrow deep end. The generator apparatus is disposed within an energy conserving chamber having a shorewardly facing opening, with the floor of the enclosure rising forwardly away from the opening for substantially immediately generating a breaking wave near the generator housing opening. The floor of the entire enclosure is graded along contour lines adapted to produce a wave which breaks laterally as the wave progresses towards the shore line, the planform walls of the enclosure conserving the wave energy and so directing the wave break that a surf rider may successfully travel a single primary wave for substantially the full length of the entire enclosure. Spaced forwardly from the wave generator, beyond the initial wave formation portion of the floor, the floor is formed with a wave regenerating cavity adapted to utilize broken primary wave energy for the regeneration of a successive wave in shallower portions of the enclosure. Circulation of water through the system is provided by a narrow inlet positioned sidewardly adjacent the wave generator housing and by one or more outlets located along the shoreline at positions of wave dissipation.

The wave generator comprises a massive buoyant plunger which is reciprocated vertically within its energy conserving chamber. A control system maintains the driving force on the plunger in phase with the natural frequency of the plunger, enabling displacement of large volumes of water with minimal energy and power requirements. The amount of displaced water, the rate of displacement and the depth of water determine the height, length and period of the wave propagated by the wave plunger. The wave characteristics may be varied by adjustment of the plunger driving force or the plunger mass. The control system includes a pilot means that automatically compensates for the gradually increasing amplitude of plunger stroke during starting, switching the input of the power means between plunger raising and plunger lowering modes in a way to reinforce the natural oscillatory motion of the plunger, to gradually increase the amplitude of the plunger stroke to a desired steady state.

In an alternative form of generator, single waves are produced by an open bottomed tank structure having air-tight side walls and a top wall, the top wall being provided with a plurality of valves. The tank structure is mounted on an inclined ramp, for leverage, and drivably connected to a prime mover by means of which the open bottom of the tank may be lowered into the body of relatively still water. Upon immersion of the tank, the valves open to permit evacuation of air through the upper end of the tank while the tank fills with water, the valves being adapted to close upon the tank subsequently being lifted from the water. As the open bottom end of the tank clears the normal water level, the volume of water within the tank is discharged effecting displacement of the water thereunder in order to create a single wave which breaks as it moves shorewardly into shallower water.

BRIEF DESCRIPTION OF THE DRAWINGS

FIG. 1 is a plan view of a surf generating system embodying the invention;

FIG. 2 is a view similar to FIG. 1, on a smaller scale, showing trajectories of wave break for waves of a given period, of different energies;

FIG. 3 is a view similar to FIG. 2 showing trajectories of wave break for similar waves of different period;

FIG. 4 is a schematic view of the control system of the wave generator apparatus;

FIG. 5 is a vertical sectional view of the wave generator, taken on the line 5—5 of FIG. 6;

FIG. 5a is a partial sectional view on the line 5a—5a of FIG. 5;

FIG. 6 is a frontal elevation, partly in section, of the wave generator of FIG. 5;

DESCRIPTION OF THE PREFERRED EMBODIMENTS

Figure 7:
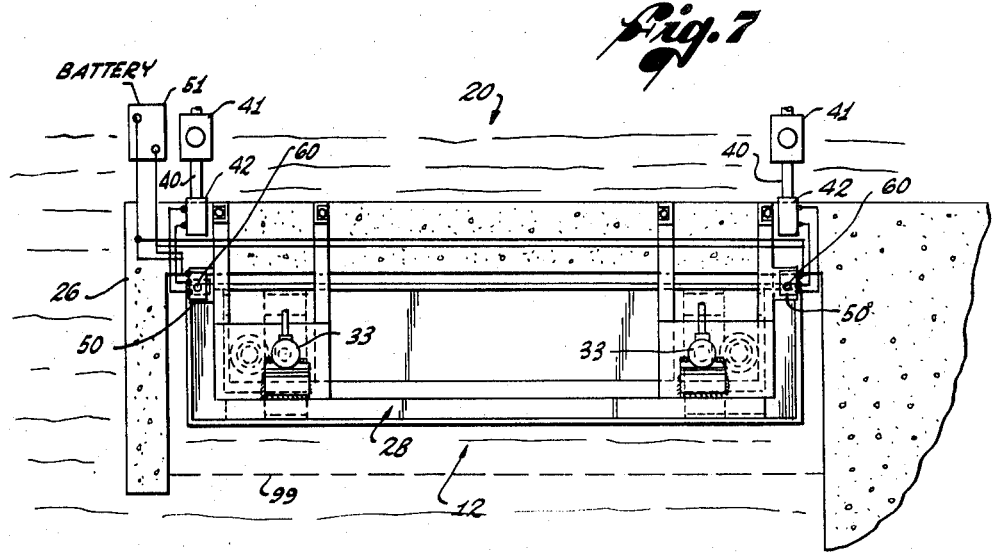
FIG. 7 is a top plan view of the wave generator apparatus.

As will be apparent, the invention may be employed in natural or artificial bodies of water. For example, referring to FIG. 1, the system may comprise an enclosure, designated generally by the numeral 10, of a predetermined planform having fluid communication with a larger natural or man-made body of water 11. The enclosure 10 is generally bounded by the structure of a wave generator chamber 12 opening towards a shoreline 13 and, on opposite sides, by walls 14 and 15 which also comprise boundaries of spits of land 16 and 17, respectively. Water from the larger body of water 11 is admitted into the enclosure 10 through an inlet passage 18, adjacent the wave generator chamber 12, and passes out of the enclosure 10 at an outlet 19, between the shoreward end of the wall 15 and the shoreline 13.

The chamber 12 contains a wave generator apparatus 20, oriented to generate successive waves in a shoreward direction. Enclosure 10 is formed with a floor 21, generally sloping upwardly towards the shoreline 13, and so oriented with respect to the generator 20 as to produce successive waves spanning the width of the enclosure 10, with each wave breaking laterally from right to left as viewed in FIG. 1.

The specific example of FIG. 1 is adapted for an installation encompassing approximately sixty thousand square feet of water surface in a cove of approximately 300 feet in length, from the generator 20 to a parallel line tangent to the shoreline 13. Since the topography of the floor 21 is essential in controlling the wave break it should be constructed of a material which is not subject to erosion as a result of the wave action. Accordingly, the floor 21 is preferably made of concrete or heavy rock, in the deeper portions at least, while sand may be distributed over the shallower portions and beyond the shoreline 13 onto a surrounding beach 22. By the same token, in order to give permanence to the desired planform of the enclosure 10, the side walls 14 and 15 are made of reinforced concrete, pilings, or the like.

The chamber 12 containing the wave generating apparatus is of a heavy construction to provide a stable support for the apparatus. Thus, as is indicated in FIG. 5, the generally U-shaped chamber is formed with a heavy footing 25 and surrounding wall 26, which may be of reinforced concrete, the entire chamber rising substantially above the undisturbed water level at the deeper end of the enclosure 10. As is shown in FIG. 6, the rear wall of the chamber may be formed with an elevated portion 27 on top of which a rigid framework 28, composed of appropriate box, channel or I beam members, may be anchored to protect forwardly as a superstructure for connection to the upper end of the wave generating apparatus and to support various components thereof. The framework 28 substantially spans the length of the chamber 12 and, adjacent opposite ends, is rigidly connected to a pair of heavy columns 29, the lower ends of which are securely anchored within the footing 25.

As is best shown in FIGS. 5 and 6, the columns 29 serve as guide means for constraining a massive plunger 30 for reciprocation in a vertical plane. The plunger may be made of a variety of materials, such as wood, concrete, or metal, and in a variety of sizes, proportional to the magnitude of waves desired to be produced. For example, in a layout such as that of FIG. 1, the chamber 12 may be approximately 40 feet in length, i.e., between the side walls, with a depth of approximately 10 feet in order to accommodate, with clearance, a plunger on the order of 38 feet long, 12 feet wide and 8 feet in depth or height. In any event, what is desired is a plunger capable of sufficient water displacement to generate waves of the desired height, that is buoyant, and, also, is of great mass, in order to utilize the forces of buoyancy and gravity in reciprocating the great mass of the plunger, with sufficient vertical amplitude of stroke to generate desired wave heights. In the present example, the mass and buoyancy of the plunger 30 are variable, as desired, and the control means includes a means for selectively limiting the input force whereby the apparatus is capable of generating waves of different energy and magnitude through a wide range.

More specifically, the illustrative plunger 30 comprises an essentially waterproof metal tank made of appropriately reinforced sheet steel that, at opposite ends, is internally rigidly provided with a vertical pair of guide sleeves 31 that slidably receive the pair of guide posts 29. The tank-like plunger 30 is provided with a filler opening means, not shown, by means of which a ballast material 32, for example a portion of the ambient water, may be introduced into the plunger in order to achieve a predetermined plunger mass. If a liquid such as water is employed as the ballast 32, slosh or baffle plates, or the like, may be provided internally of the tank-like structure in order to inhibit undesired random movement of the ballast material out of phase with the motion of the plunger.

The superstructure framework 28 mounts a spaced pair of pneumatic cylinders 33 adjacent the opposite ends of the plunger 30. As is shown in FIGS. 5 and 6, the cylinders 33 are vertically disposed, each having a downwardly projecting piston rod 34 extending inwardly into the plunger 30 for driving connection, at a lower end, to one of a pair of cross beams 35 rigidly affixed between opposite side walls of the tank-like plunger 30. It will be appreciated that the pneumatic cylinders 33 are illustrated schematically only but, in actuality, are of a sufficient length to provide a sufficient amplitude of stroke to accomplish the desired amplitude of reciprocation of the plunger 30. At the same time, the plunger 30, when adjusted for the desired mass, seeks its own equilibrium level relative to the normal still water level of the enclosure 10. Accordingly, the piston rods 34 preferably each comprise a sleeved pair of members capable of being interlocked by a locking means 36 to achieve the proper degree of extension of the piston rods 34 for each different equilibrium level of the plunger. This adjustment means may take the form, for example, of slots or holes 37 formed in one portion of the piston rod assembly, as indicated at 37, spaced longitudinally thereof, and adapted to receive the locking pin means.

As is schematically shown in FIG. 4, the cylinders 33 are connected to an appropriate source of compressed air by means of a conduit 40, having an adjustable pressure regulator 41 interposed therein, a four-way solenoid valve 42, and appropriate manifolds 43 and 44. They cylinders 33 are, preferably, of the double acting type and, accordingly, the manifold 44 is connected between each cylinder 33 and the valve 42 in a manner to introduce compressed air to the lower end of each cylinder 33 beneath the piston. Conversely, the manifold 43 is interconnected between the valve 42 and the upper end of each cylinder 33 for cyclically introducing compressed air to the upper end of the cylinder above the piston. The valve 42 is also provided with an outlet 45 for alternately venting to the atmosphere air being discharged from either the upper or lower ends of the cylinders 33. In addition, the valve 42 has a neutral position in which both of the manifolds 43 and 44 are vented to atmosphere through the outlet 45.

The solenoid valve 42 has a pair of terminals 46 and 47 connected in electrical parallel to opposite contacts 48 and 49 respectively of a single-pole double throw switch 50. A power supply 51 is connected to the switch 50 via a main power switch 52 and to a common terminal 53 of the solenoid valve 42. The arrangement is such that when the solenoid terminal 46 is energized compressed air is admitted to the lower manifold 44, while the upper manifold 43 is simultaneously in communication with the atmospheric outlet 45. Conversely, when the solenoid terminal 47 is energized compressed air is delivered through the manifold 43 to the upper end of the cylinders 33, while the lower manifold 44 is then vented to atmosphere via the outlet 45. When the power switch 52 is open, the solenoid valve 42 returns to a neutral position in which both manifolds 43 and 44 are vented to atmosphere through the outlet 45.

The switch 50 comprises a portion of a pilot means adapted to translate reversals of the direction of oscillation of the plunger 30 into the corresponding actuation of the solenoid valve 42 for delivering power in phase with the upward and downward movement of the plunger. Since the plunger 30 has neither upward or downward sense when it is at rest, a momentary manual switch 55 is utilized to initiate the plunger motion to, in turn, actuate the pilot means which, thereafter, automatically accomplishes actuation of the valve 42 to deliver power in phase with the plunger motion. Accordingly, a momentary manual switch 55 is connected between the solenoid valve terminal 46 and the power supply 51. As a result, closing of the switch 55 opens the valve 42 in a manner to admit compressed air to the lower manifold 44 to initiate upward movement of the pistons in the train of cylinders 33, concurrently venting the upper end of the cylinders to atmosphere. The cylinders 33 force the plunger 30 upwardly above its equilibrium position only a few inches on this initial input of power, simultaneously actuating the pilot means.

The switch 50 includes a switch arm 57 that is pivotally mounted, as at 58, to make and break contact with the opposed switch contacts 48 and 49. This switch arm is a longitudinal extension of a switch actuating arm 59 having a lost-motion connection with a vertically elongated rod 60 that is affixed to and carried by the plunger 30. Thus, as can be seen from FIG. 5a, the outer end of the switch actuating arm 59 telescopically slidably contains a rod 61 with a bifurcated outer end 62 mounting a roller 63 in frictional rolling engagement with a flat side or track of the member 60. A spring 64 within the actuating arm 59 effects biasing of the roller 63 into contact with the member 60 throughout the arcuate range of movement of the switch actuating arm 69.

As will now be apparent, initial upward movement of the plunger 30 effects corresponding upward movement of the member 60 with consequent counterclockwise pivoting of the switch arm 59 to close contact 48. Then, when the gravitational force of the plunger 30 overcomes the lifting forces on the plunger, to reverse the plunger direction, the switch actuating arm 59 pivots clockwise as the gravitational force of the plunger effects lowering of the elongate member 60. Accordingly, the switch arm 57 now makes contact with the other switch terminal 49, energizing the solenoid valve 42 to admit compressed air to the top of the pistons in the cylinders 33, while air in the lower ends of the cylinders is bled to atmosphere through the manifolds 44 and outlet 45. Compressed air now augments the mass of the plunger to move the plunger 30 downwardly below its equilibrium position until overcome by the increasing buoyant force on the plunger 30. Consequent reversal and rising of the plunger 30 effects another reversal of the switch 50, initiating a new cycle of reciprocation of the plunger, again or with the force of buoyancy now being augmented by the force of the compressed air.

It will be seen that this cycle continues, the each stroke of the plunger 30 being reinforced so that the amplitude of the plunger stroke gradually increases until a steady state condition is attained, the magnitude of the amplitude being a function of the mass of the plunger and the preadjusted compressed air input.

In order to deactivate this system, the power supply 51 is merely shut down by opening of the switch 50. As a result, the valve 42 returns to the neutral position. As both the upper and lower manifolds 43 and 44 are open to atmosphere, the plunger is then free to oscillate with natural declining frequency.

Steady state amplitude and frequency of the plunger 30 are adjustable by variation of the air pressure by adjustment of the regulator 41, and by varying the plunger mass, as by varying the amount of the ballast 32. By so controlling the motion of the plunger, water waves of various characteristics of height, frequency and wave length are generated.

As will now be apparent, the drive system just described may be modified whereby compressed air is delivered to single acting cylinders in phase with only one or the other of the forces of buoyancy and gravity acting on the plunger 30. While not as efficient, such modification nevertheless attains the objective of phased reinforcing the natural oscillatory motion of the plunger 30, to displace large volumes of water with minimal energy and power requirements. It will also be apparent that other types of drive systems may be employed for deliverying energy in phased relation with either or both of the forces of buoyancy and gravity acting on the plunger. For example, a cable system reeved on a suitable array of pulleys and drums employing slip clutches may be connected to either the top or bottom or both of the plunger 30, the slip clutches being adjusted for release at predetermined degrees of frictional engagement.

Figure 8:
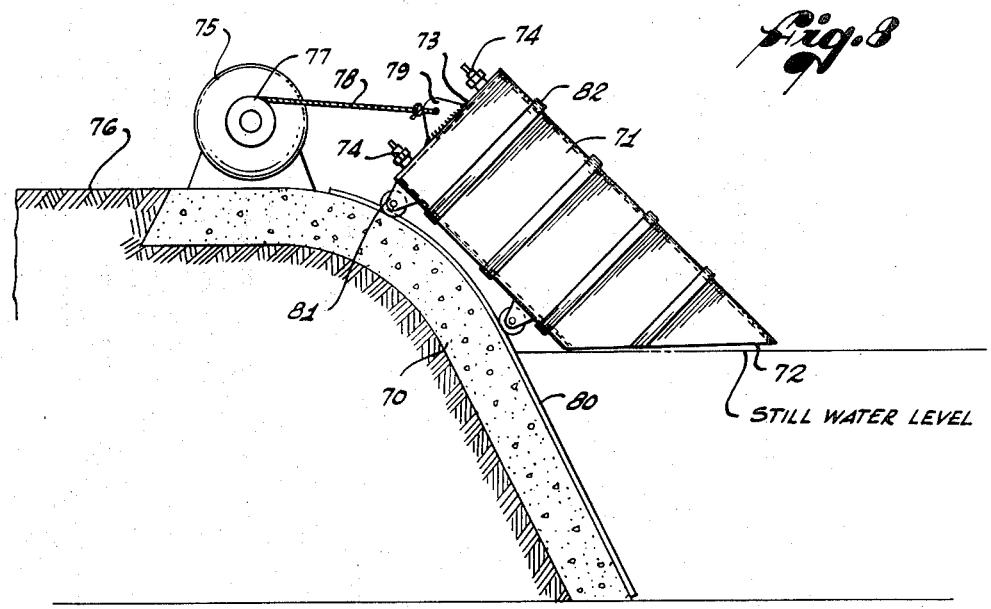
FIG. 8 is a side elevational view of an alternative form of wave generator.

An alternative form of wave generator is shown in FIG. 8, adapted for generation of single waves. In this modification, the chamber 12 is modified to have a rear wall 70 that inclines rearwardly upwardly relative to the open front end of the chamber. In this case, a water tight tank 71 has an open lower end 72, and a top wall 73 mounting a plurality of purge valves 74. A prime mover 75 is mounted on top of an embankment 76 or other surface behind and above the wall 70, the prime mover 75 having driving engagement with a drum 77 on which a cable 78 is wound upon actuation of the prime mover 75. The other end of the cable 78 is connected to an appropriate bracket 79 secured to the top of the tank 71.

The forward face of the wall 70 is provided with a plurality of spaced vertically extending tracks 80, within which a plurality of wheel means 81 of the tank 71 are rollingly guided. With this inclined track system, it will be apparent that leverage is provided to minimize the force required to roll the tank 71 upwardly, in operation of the wave generator.

The tank 71 is preferably of elongated rectangular planform, as viewed from above, i.e. normal to the plane of the top wall 73, and is made with a reinforced side wall construction, for example spaced surrounding bands 82, in order to resist the differential pressures to which the side walls in particular will be subjected. The open lower end 72 of the tank lies in a plane such that when the tank 71 is in the fully raised position illustrated, the opening is positioned in an approximately horizontal plane.

In the operation of the form of generator shown in FIG. 8, a brake or clutch device (not shown) is released to allow the cable 78 to unwind from the drum 77. As a result, the tank 71 is lowered into the water, filling through the opening 72 while the air captured within the tank escapes through the purge valves 74. The valves 74 may be simple one-way flapper valves, or one-way spring loaded valve set to close automatically at a predetermined differential of ambient and interior air pressures. In any event, after a volume of water has entered the tank 71, the prime mover 75 may be actuated to lift it up the inclined rear wall 70, the valves 74 then being closed. As a result a given volume of water is raised and when the open bottom 72 of the plunger tank clears the normal still water level, or hydrostatic equilibrium is otherwise upset, the raised volume of water discharges resulting in the propagation of a water wave.

The alternative wave generator of FIG. 8 may be employed where patronage is limited and continuous wave production is not required, as well as in circumstances where the power supply may be limited.

FIG. 1 illustrates a presently preferred overall planform and underwater topography of the enclosure 10, that is adapted to make optimum utilization of the waves cyclically generated by the generator 20. Within the given area of the enclosure 10, the combination of planform and underwater topography are adapted to provide optimum wave break forms; a maximum length of surf board run; generation and regeneration of breaking waves out of a single cycle of actuation of the generator 20; areas in which waves do not break to be utilized as pathways for surf boards returning to the initial wave build-up area or as calm swimming and diving areas; and a shallow water region where waves are patterned to break in an optimum manner for belly boarding, surf rafting and body surfing.

For the foregoing purposes, it will be observed that one side wall 14 comprises a continuation of one side wall of the chamber 12, projecting shorewardly in a direction normal to the plane of the opening of the chamber 12. The other side wall 15 diverges shorewardly away from the opposed side wall 14 to the shoreline. The shoreline 13 curves away from the longer wall 15, beyond the projection of the relatively short wall 14, and thence curves towards the short wall 13 to merge thereinto at a location approximately opposite to the approximate mid point of the length of the wall 15.

The topography of the floor 21 of the enclosure 10 is shown by contour lines 90, each being marked with its depth in feet below the mean or still water level of the water contained in the enclosure. It will be observed that the relatively deep water contour lines, immediately adjacent the opening of the chamber 12, range spanwise of the walls 14 and 15 in a direction generally paralleling the plunger of the generator apparatus 20, but gradually define more acute angles with the long wall 15 with decrease in depth along that wall. It will be observed, also, that certain contour lines 90a do not span the entire width of the enclosure 10 but, instead, define loops indicating a second deep water portion of the enclosure 10, elongated generally in a direction angularly related to the longitudinal axis of the plunger of the generator apparatus 20 and tending towards parallelism with the long wall 15.

The dashed line 91 of FIG. 1 illustrates the trajectory of the path of the leading edge break of a primary wave generated by the apparatus 20. Thus, the wave initially breaks immediately in front of the generator apparatus 20 at the end 91a of the line, characterized as a fast and steep breaking wave section. Immediately thereafter, due to the divergence of the walls 14 and 15 and the gradually decreasing shallowness of the water, the wave height will gradually diminish as the wave progresses shoreward. As a consequence, the wave break decreases gradually along the line 91, requiring numerous turning maneuvers by the surfer to maintain an optimum position in the wave if he is to successfully complete a run for the full length of the line 91.

The second deep water portion of the floor 21, as represented by the contour lines 90a, defines a regenerating cavity utilizing the energy of a previously broken primary wave to reform the wave before it has lost all of its energy of turbulence. This regenerating cavity approximately corresponds in its longitudinal aspect to the initial portion of the path of the primary wave break, as indicated by the line 91, and effects reforming of the wave energy into a new secondary wave in the cove-like shallow water portion indicated at 92, as illustrated by the wave break trajectory along lines 93 and 94 in FIGS. 2 and 3.

Referring to FIG. 1, it will be seen by comparison of the wave break trajectory line 91 and the adjacent wall 15 that the topography of the enclosure bottom is such that waves do not break within this strip of water, generally indicated at 95. Similarly, waves do not break within the regenerating cavity included within the second deep water contour lines 90a, so that these two areas are useable as pathways for surf boards returning to the initial wave build-up, or as relatively calm swimming and diving areas.

FIG. 2 illustrates the manner in which the topography of the enclosure bottom 21 accommdates different wave heights of a given period in producing the wave break trajectories shown, both for the primary and secondary trajectories 96 and 93, respectively. As is shown by comparison of the five foot, four foot and three foot primary trajectories 96, the larger waves break in deeper water and yield a faster ride.

FIG. 3 illustrates different wave break primary and secondary trajectories 97 and 94, respectively, resulting from different wave generator frequencies. When the plunger is more massive, the period T of the wave increases as the plunger moves more slowly. For a given wave height, the wave of the longer period, e.g. seven seconds, will yield a faster ride with a more critical and powerful wave section threatening the rider as he tries to escape in front of the break. The same result follows with the secondary wave break trajectories compared in the shallower cove area 92.

A protective barrier 99 may be provided in the opening of the chamber 12 to prevent a wave user being drawn into contact with the generator 20. This barrier may take the form of heavy wire-mesh fencing, as shown, or laterally spaced vertically and/or horizontally disposed rods or other relatively open rigid means that will not unduly disturb the formation of waves emitted from the chamber 12. As will be apparent, if the wave generation is accomplished by a row of relatively small, synchronized plungers in individual chambers, rather than by a single large, greatly elongated plunger of the given example, each chamber may be provided with its own safety barrier.

While certain presently preferred embodiments of the invention have been disclosed, it will be apparent that various modifications in the design, arrangement of ports and instrumentalities of the invention are obviously possible.

We claim:

1. A method of generating waves in a body of water comprising:

supporting a rigid body in the water for vertical oscillation of the body relative to the surface of the body of water in response to an imbalance of the forces of buoyancy and gravity acting on the body; and applying an external force during one, at least, of the directions of oscillation of the body, in phase with the greatest one of the forces of buoyancy and gravity then acting on the body.

2. A method as in claim 1 that comprises making the body with a mean density lower than that of the water.

3. A method as in claim 1 that comprises terminating the application of the external force to the body at a predetermined imbalance of the forces of buoyancy or gravity acting on the body.

4. A method as in claim 1 in which the same external force is alternately applied to raise and lower the body in phase with the forces of buoyancy and gravity, respectively.

5. A method as in claim 2 in which the rigid body is initially vertically displaced out of a condition of buoyant equilibrium by applying the external force in a direction to augment one of the forces of buoyancy and gravity acting on the body.

6. A method as in claim 5 which includes the step of interrupting the application of the external force when the opposing one of the forces of buoyancy and gravity acting on the body is at least equal to the augmented one of the forces of buoyancy and gravity.

7. A method as in claim 6 in which the external force is applied during both directions of oscillation of the rigid body and in phase with the greatest one of the forces of buoyancy and gravity then acting on the body.

* * * * *

PO-1050
(5/69)

UNITED STATES PATENT OFFICE
CERTIFICATE OF CORRECTION

Patent No. 3,789,612          Dated  February 5, 1974

Inventor(s) George E. Richard, Eugene D. Richard

It is certified that error appears in the above-identified patent and that said Letters Patent are hereby corrected as shown below:

In the specification, column 8, line 60, delete "wave".

Signed and sealed this 29th day of October 1974.

(SEAL)
Attest:

McCOY M. GIBSON JR.
Attesting Officer

C. MARSHALL DANN
Commissioner of Patents